(12) United States Patent
Anderson et al.

(10) Patent No.: US 11,609,243 B2
(45) Date of Patent: Mar. 21, 2023

(54) METHOD OF HEALTH MANAGEMENT AND ASSESSMENT FOR A MULTI-FUNCTION AIR DATA PROBE

(71) Applicant: Honeywell International Inc., Charlotte, NC (US)

(72) Inventors: Morris G. Anderson, Mesa, AZ (US); Grant A. Gordon, Peoria, AZ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/562,495

(22) Filed: Dec. 27, 2021

(65) Prior Publication Data
US 2022/0120780 A1     Apr. 21, 2022

Related U.S. Application Data

(62) Division of application No. 16/735,366, filed on Jan. 6, 2020, now Pat. No. 11,215,631.

(60) Provisional application No. 62/916,091, filed on Oct. 16, 2019.

(51) Int. Cl.
*G01P 5/16* (2006.01)
*G01P 13/02* (2006.01)
*G01F 1/46* (2006.01)
*G01P 5/165* (2006.01)

(52) U.S. Cl.
CPC .............. *G01P 13/025* (2013.01); *G01F 1/46* (2013.01); *G01P 5/165* (2013.01)

(58) Field of Classification Search
None
See application file for complete search history.

(56) References Cited

U.S. PATENT DOCUMENTS

| | | | |
|---|---|---|---|
| 4,444,060 A | 4/1984 | Yamamoto |
| 4,513,419 A | 4/1985 | Small |
| 4,718,273 A | 1/1988 | McCormack |
| 4,836,019 A | 6/1989 | Hagen et al. |
| 5,007,286 A | 4/1991 | Malcolm et al. |
| 5,025,661 A | 6/1991 | McCormack |

(Continued)

FOREIGN PATENT DOCUMENTS

ES  2327865  11/2009

OTHER PUBLICATIONS

European Patent Office, "Extended European Search Report from EP Application No. 20199120.5", from Foreign Counterpart to U.S. Appl. No. 16/735,366, dated Jun. 18, 2021, pp. 1 through 10, Published: EP.

(Continued)

*Primary Examiner* — Harshad R Patel
(74) *Attorney, Agent, or Firm* — Fogg & Powers LLC (57) ABSTRACT

A method of health management and assessment for an air data probe comprises performing a calibration process for the air data probe prior to installation of the air data probe on a vehicle; performing an operational process after the air data probe is installed on the vehicle; computing residuals for individual pressure channels of the air data probe and an aggregated response function, based on outputs from the calibration process and the operational process; storing and trending the residuals over time; evaluating a trendline for the residuals against one or more threshold values; and announcing a message when one or more of the threshold values is exceeded, indicating that the health of the air data probe is compromised.

10 Claims, 12 Drawing Sheets

(56) References Cited

U.S. PATENT DOCUMENTS

| | | | |
|---|---|---|---|
| 5,423,209 | A | 6/1995 | Nakaya et al. |
| 5,653,538 | A | 8/1997 | Phillips |
| 6,101,429 | A | 8/2000 | Sarma et al. |
| 6,305,218 | B1 | 10/2001 | Foster |
| 7,461,548 | B2 | 12/2008 | Toulmay |
| 7,490,510 | B2 | 2/2009 | Agami et al. |
| 8,695,412 | B2 | 4/2014 | Mandle |
| 10,951,418 | B1 | 3/2021 | Graziano et al. |
| 2004/0093953 | A1 | 5/2004 | Gilkison et al. |
| 2004/0261518 | A1 | 12/2004 | Seidel et al. |
| 2005/0011285 | A1 | 1/2005 | Giterman |
| 2007/0107510 | A1 | 5/2007 | Agami et al. |
| 2013/0061964 | A1 | 3/2013 | Boisseleau et al. |
| 2015/0090050 | A1 | 4/2015 | Wiklund |
| 2016/0258974 | A1 | 9/2016 | Golovkin et al. |
| 2018/0167391 | A1 | 6/2018 | Lawson et al. |
| 2019/0346476 | A1 | 11/2019 | Whalen et al. |
| 2021/0116474 | A1 | 4/2021 | Anderson et al. |

OTHER PUBLICATIONS

European Patent Office, "Partial European Search Report from EP Application No. 20199120.5", from Foreign Counterpart to U.S. Appl. No. 16/735,366, dated Mar. 16, 2021, pp. 1 through 11, Published: EP.

U.S. Patent and Trademark Office, "Notice of Allowance", U.S. Appl. No. 16/735,366, dated Aug. 31, 2021, pp. 1 through 9, Published: US.

U.S. Patent and Trademark Office, "Office Action", U.S. Appl. No. 16/735,366, dated May 26, 2021, pp. 1 through 20, Published: US.

U.S. Patent and Trademark Office, "Restriction Requirement", U.S. Appl. No. 16/735,366, dated Apr. 30, 2021, pp. 1 through 5, Published: US.

METHOD OF HEALTH MANAGEMENT AND ASSESSMENT FOR A MULTI-FUNCTION AIR DATA PROBE

CROSS REFERENCE TO RELATED APPLICATIONS

This application is a divisional application of U.S. application Ser. No. 16/735,366, filed Jan. 6, 2020, which is herein incorporated by reference. This application also claims the benefit of priority to U.S. Provisional Application No. 62/916,091, filed on Oct. 16, 2019, which is herein incorporated by reference.

BACKGROUND

Safe aircraft operation requires a knowledge of the flight environment including speed, angle of attack, and altitude. This information is routinely acquired with externally mounted air data probes. However, "state-of-the-art" air data probe designs are prone to malfunction caused by icing, impact with birds, and plugging with debris and/or insects. This has been observed recently through multiple aircraft accidents resulting in significant loss of life.

Therefore, a more robust air data probe capable of measuring aircraft speed and angle of attack is needed. There is also a need for a simplified air data architecture that will reduce total ownership costs of the system.

SUMMARY

A multi-function air data probe comprises a probe stem having an outer surface that extends between a first end and an opposite second end, with the probe stem having a first cross-sectional diameter; and a probe head having an outer surface that extends between a proximal end and a distal end, wherein the proximal end of the probe head is coupled to the first end of the probe stem. The probe head has a second cross-sectional diameter that is larger than the first cross-sectional diameter of the probe stem. A plurality of multi-hole ports is located in the probe head, with the multi-hole ports extending into and through the probe stem. The air data probe is operative to make measurements used to determine one or more of angle of attack values, total pressure values, and static pressure values.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A multi-function air data probe for detecting airflow angle, static pressure, and total pressure, is described herein.

The air data probe generally includes a probe stem and a probe head coupled at one end of the probe stem, with the probe stem having a smaller diameter than the probe head. A plurality of multi-hole ports are located in the probe head. A base flange can be coupled to the probe stem at an opposite end, with the base flange having one or more static pressure ports. The air data probe is operative to make measurements used to determine total pressure, static pressure, and angle of attack values.

The probe stem and probe head can each have a substantially cylindrical shape. The probe stem and the probe head can optionally each include flow stability features on their outer surfaces. In some embodiments, the air data probe can also include a digital component and software algorithm that provides a self-aware health assessment and management capability for the probe.

The air data probe has the following technical benefits. The shape of the probe head enables precise fabrication, which leads to high quality probe calibration and pressure measurement. The shape of the probe head does not have any sharp edges, making it robust against handling, erosion, and hail impact damage. The probe head design is easily heated to protect against various icing threats (e.g., supercooled water droplets, ice crystals, rain). As the probe head is larger than the probe stem, this minimizes the influence of span-wise flow on the pressure measurement.

The multi-hole ports in the probe head have the benefit of reducing the influence of imperfections in each of the separate manifold pressure measurements. In addition, the multi-hole ports are robust against plugging from dirt, hail, icing, bugs, etc. The flow stability features on the probe head and stem when used provide the benefit of minimizing pressure fluctuations caused by wake vortex shedding. In one embodiment, the flow stability features are matching fins on left and right hand sides of a principle structure of the air data probe, with the fins having a substantially triangular cross section profile.

The air data probe has a robust design, with round parts, simple radial holes, no sharp edges around the holes, and simple routing for pressure tubes. The air data probe also allows for a simple heater layout configuration, using either a cable or film, and has an un-handed design.

The air data probe is designed for accurate measurement. For example, the multiple holes for each pressure sensor minimizes sensitivity to fabrication tolerances. In addition, the critical pressure sensing surface is axisymmetric. When the air data probe is mounted on a vehicle, the probe head is positioned outside of a boundary layer and peak ice concentration zones.

The air data probe is capable of making measurements that can be used to determine (ambient) total pressure (PTamb), (ambient) static pressure (PSamb) and angle of attack (AOA) values. The air data probe is configured to provide highly accurate static pressure (PS) measurements and total pressure (PT) measurements that are insensitive to AOA up to about ±50°. The air data probe is also configured to provide a highly accurate AOA measurement for an AOA up to about ±50°.

Further, the pressure measurement distribution of pressure (psi) modules in the air data probe can be compared with calibration curves to evaluate individual measurement degradation during operation.

When implemented on a vehicle such as an aircraft, the air data probe is configured to provide measurement of the aircraft AOA, static pressure, and total pressure. This enables calculation of aircraft speed, AOA, and altitude, for flight control management.

The air data probe provides a design that is simple to manufacture and for low cost, versus a traditional L-shaped or spherical head/nose designs. A cylindrical design of the air data probe also yields higher pressure, altitude, speed, and AOA accuracy, combined with the ability to self-diagnose individual degradation without losing functionality. Combined with onboard electronics, the air data probe can enable real-time monitoring of aircraft flight profile changes to enhance aircraft safety.

In addition, the air data probe can be implemented in a digital line replaceable unit (LRU) for an aircraft. The data generated by the air data probe can reside in onboard air data computers, or can be live-streamed to remote servers.

Further details of various embodiments are described hereafter with reference to the drawings.

Figure 1A:
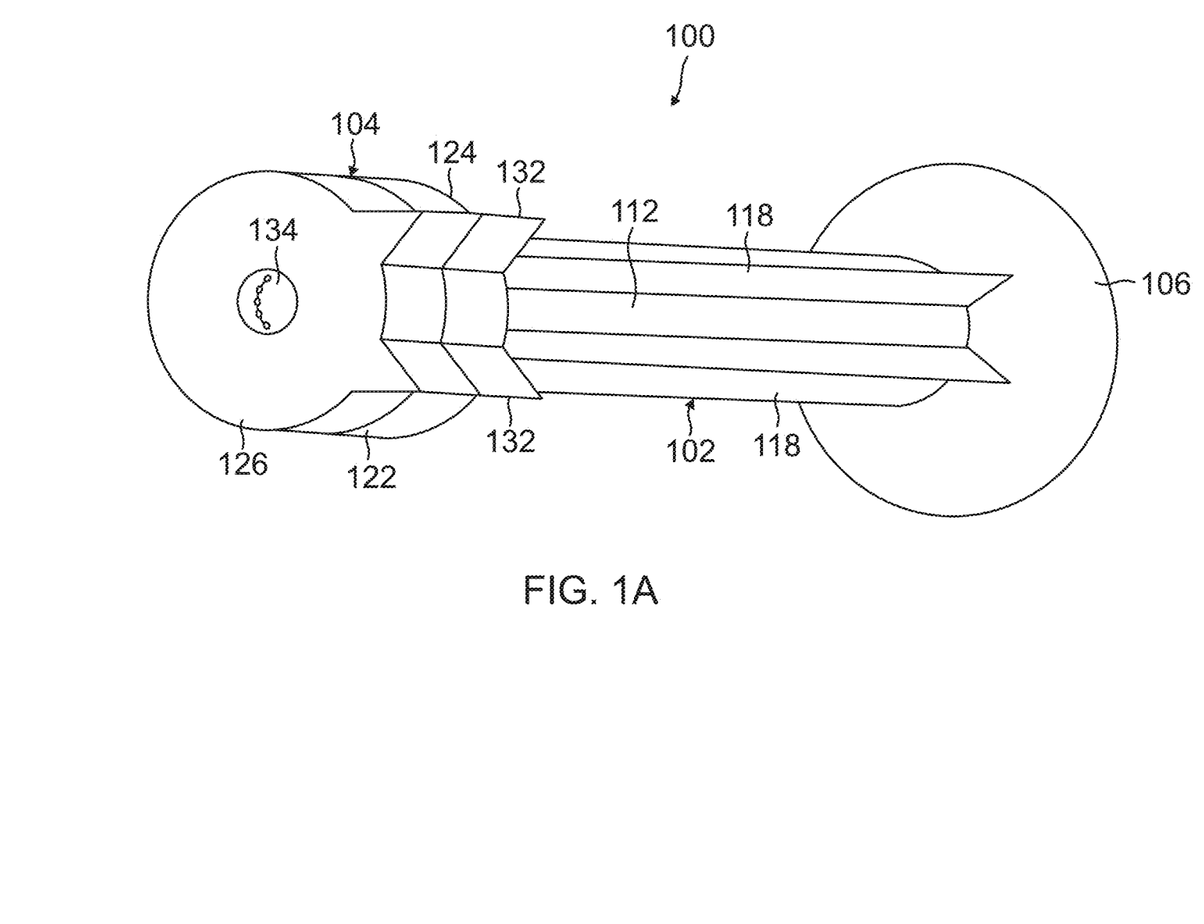
FIGS. 1A and 1B are isometric exterior views of a multi-function air data probe, according to one embodiment.
Figure 1B:
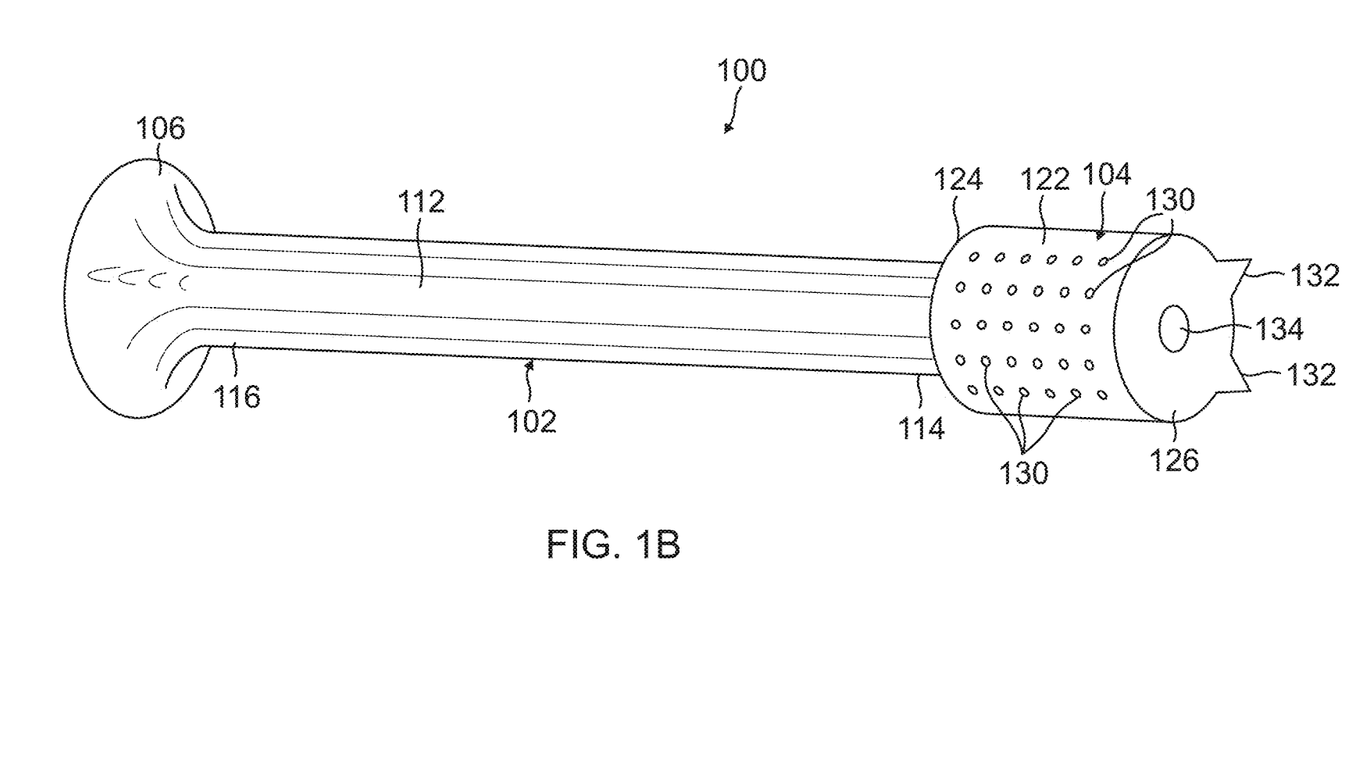

FIGS. 1A and 1B illustrate isometric views of a multi-function air data probe 100, according to one example embodiment. The air data probe 100 generally includes a probe stem 102, a probe head 104 coupled to probe stem 102 at one end, and a base flange 106 coupled to probe stem 102 at an opposite end. In one implementation, probe stem 102 has a substantially cylindrical shape with a first cross-sectional diameter, and probe head 104 has a substantially cylindrical shape with a second cross-sectional diameter that is larger than the first cross-sectional diameter of probe stem 102.

In one embodiment, the cross-sectional diameter of probe head 104 can be at least about 10 percent larger than the cross-sectional diameter of probe stem 102. In other embodiments, the cross-sectional diameter of probe head 104 can be about 10 to about 100 percent larger than the cross-sectional diameter of probe stem 102. In addition, while air data probe 100 is shown to have an abrupt transition between probe stem 102 and probe head 104, in other embodiments, the transition between the probe stem and probe head can be more gradual such as by using a tapered transition section.

The probe stem 102 has an outer surface 112 that extends between a first end 114 and an opposite second end 116. Optionally, a set of flow stability structures 118 can protrude from and extend along outer surface 112 of probe stem 102, as shown in FIG. 1A. The flow stability structures 118 encourage smooth air flow off a trailing edge of the structures to avoid vortex shedding. In one embodiment, flow stability structures 118 can have a substantially triangular shape.

The probe stem 102 can have a hollow structure, or a solid interior except for passageways, to provide for static pressure communication to base flange 106.

The probe head 104 has an outer surface 122 that extends between a proximal end 124 and a distal end 126. The proximal end 124 of probe head 104 is coupled to first end 114 of probe stem 102. The outer surface 122 has an array of sensor holes 130 located along a portion thereof, as shown in FIG. 1B. The sensor holes 130 are configured to align with a plurality of multi-hole ports in probe head 104 (described further hereafter).

The probe head 104 can optionally have a set of flow stability structures 132 that protrude from and extend along outer surface 122. The flow stability structures 132 generally align with flow stability structures 118 when present on probe stem 102. The flow stability structures 132 encourage smooth air flow off a trailing edge of the structures to avoid vortex shedding. In one embodiment, flow stability structures 132 on probe head 104 can have a substantially triangular shape.

The probe head 104 can have a hollow structure, or a solid interior except for passageways, to provide for static pressure communication to probe stem 102 and base flange 106. An optional drain hole 134 can be located in distal end 126 of probe head 104. One or more static pressure ports (not shown) can be located in base flange 106.

Figure 2:
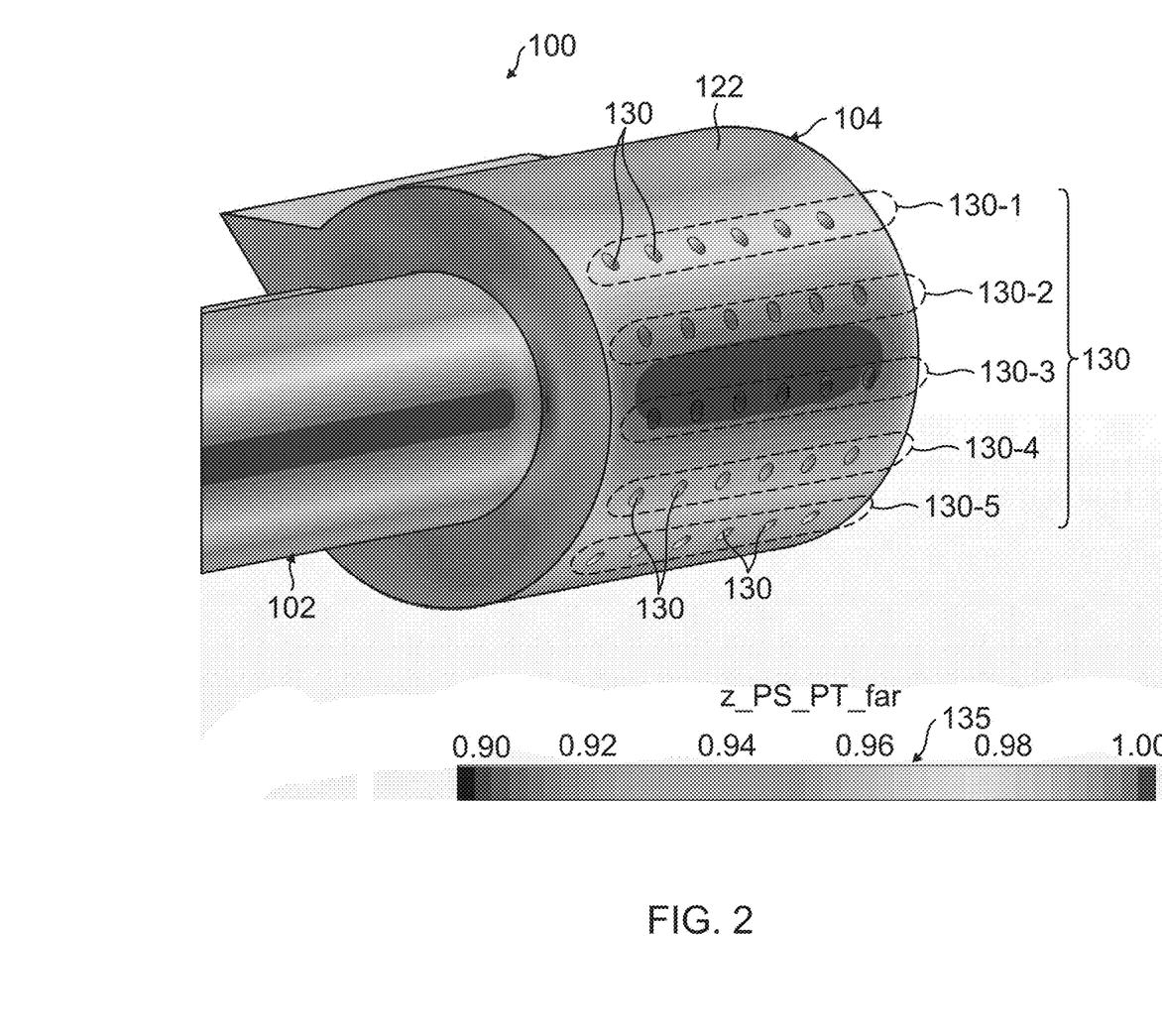
FIG. 2 is an enlarged isometric view of one end of the air data probe of FIG. 1.

FIG. 2 is an enlarged isometric view of one end of air data probe 100, showing further details of probe head 104 coupled to probe stem 102. In this example embodiment, the array of sensor holes 130 includes a first sensor hole row 130-1, a second sensor hole row 130-2, a third sensor hole row 130-3, a fourth sensor hole row 130-4, and a fifth sensor hole row 130-5. Each of the five sensor hole rows 130-1 to 130-5 include multiple sensor holes 130. Although each sensor hole row is shown to have six holes, it should be understood that in other embodiments, more or less holes can be used in each row. FIG. 2 also shows a bar graph 135, which depicts the (surface static pressure)/(free stream total pressure) (z_PS_PT_far) from a modeling simulation corresponding to air data probe 100.

Figure 3A:
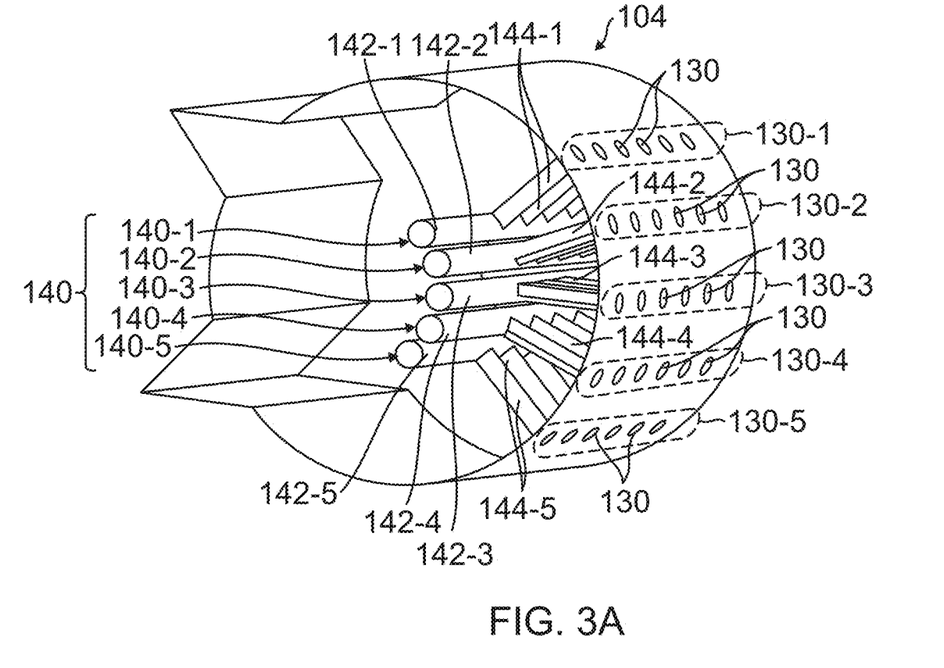
FIGS. 3A and 3B are isometric interior views of a probe head of the air data probe of FIG. 1.
Figure 3B:
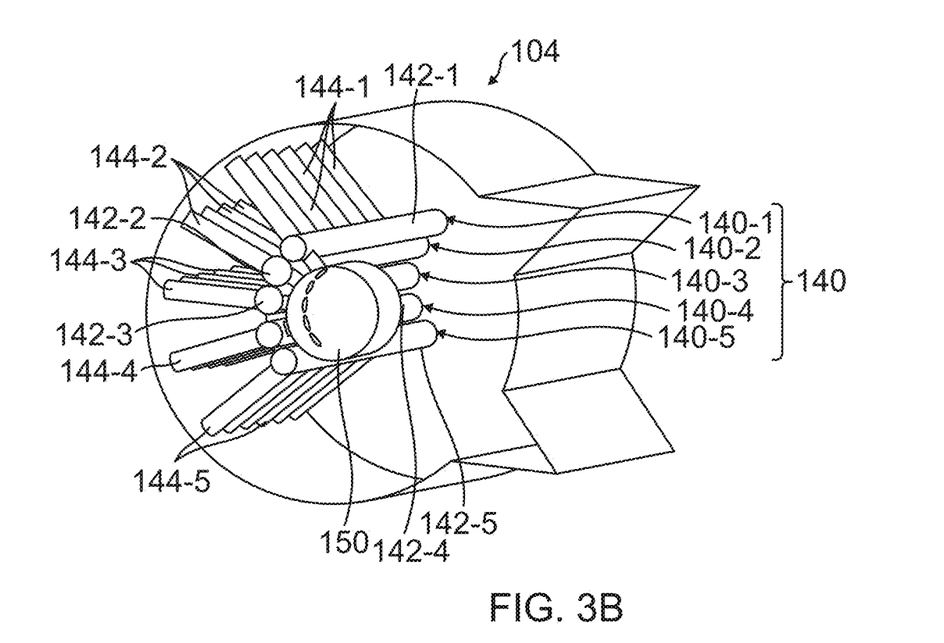

FIGS. 3A and 3B are isometric interior views of probe head 104. As depicted, a plurality of multi-hole ports 140 are located in probe head 104, and are configured to extend into an through the probe stem. The multi-hole ports 140 include a first multi-hole port 140-1, a second multi-hole port 140-2, a third multi-hole port 140-3, a fourth multi-hole port 140-4, and a fifth multi-hole port 140-5. Each of the multi-hole ports 140-1 to 140-5 include respective sensor manifold tubes 142-1 to 142-5, which respectively communicate with sensor hole rows 130-1 to 130-5 (FIG. 3A) through multiple sets of port tubes 144-1 to 144-5.

In one example, each of multi-hole ports 140-1 to 140-5 are connected to respective pressure transducers in pressure modules located in an air data sensor housing. The multi-hole ports 140-1 to 140-5 advantageously reduce the influence of imperfections in each of the five separate manifold pressure measurements.

As shown in FIG. 3B, a drain port 150 is communicatively coupled to sensor manifold tubes 142-1 to 142-5. The drain port 150 communicates with drain hole 134 (FIGS. 1A and 1B), to provide an outlet for excess air from manifold tubes 142-1 to 142-5.

Although five multi-hole ports are shown in the embodiment of FIGS. 3A and 3B, it should be understood that in other embodiments, more or less of such multi-hole ports can be used in an air data probe as needed, to achieve a desired performance for the probe.

Figure 4:
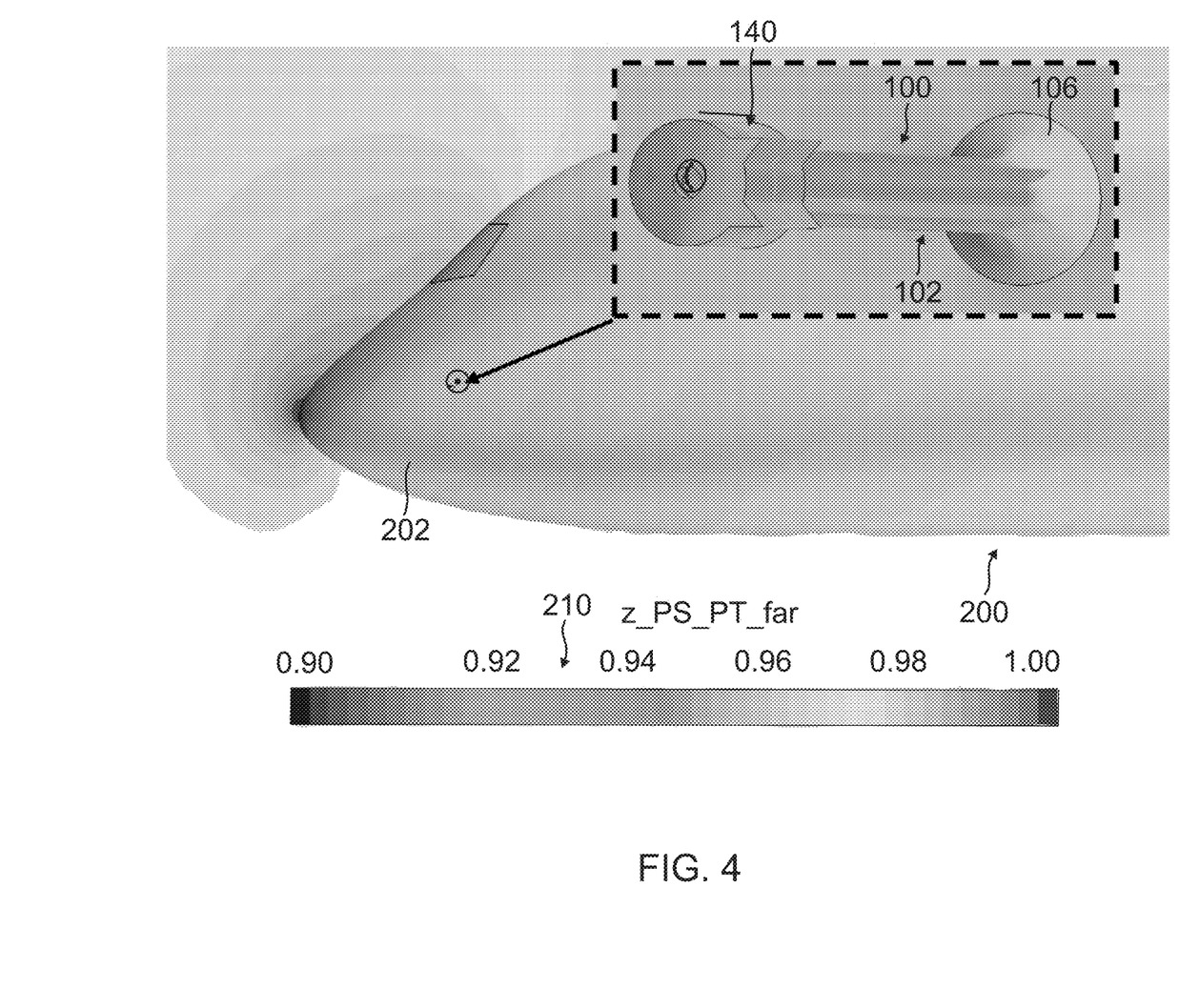
FIG. 4 is a schematic illustration showing an exemplary vehicle mounting location for the air data probe of FIG. 1.

FIG. 4 is a schematic illustration showing an exemplary vehicle mounting location for air data probe 100. For example, air data probe 100 can be mounted on an aircraft 200 in a nose section 202. FIG. 4 also shows a bar graph 210, which depicts the (surface static pressure)/(free stream total pressure) (z_PS_PT_far) from a modeling simulation corresponding to air data probe 100 mounted on aircraft 200.

The air data probe 100 is designed to meet PS, PT, and AOA requirements for a range of AOA of up to about ±50°. The PT is calculated directly from static pressures measured in the probe head. This is accomplished by curve fitting the results and calculating the maximum value. The AOA is also calculated directly from the static pressure measurements in the probe head using calibration test results. The rows of sensor holes in the probe head, combined with static pressure ports in the probe base flange and/or aircraft fuselage static ports, enable the meeting of static pressure measurement accuracy requirements for aircraft.

The air data probe 100 can measure static pressure values in two different ways: from the pressure values captured through sensor holes 130 in the probe head, as well as from the pressure values captured through independent static pressure ports in base flange 106. It should be noted that the static pressure values measured in the probe head are not ambient static values. However, the ambient static, total, and AOA values can be extracted from the measurements taken at the different multi-hole sensor ports in the probe head using the approach described herein.

FIGS. 5A-5D illustrate various views of a multi-function air data sensor 300, according to an exemplary embodiment. The air data sensor 300 includes an air data probe 310 that is configured to protrude into an airflow to collect air data, a base plate 320 for attaching air data probe 310 (e.g., to a fuselage of an aircraft), and a housing 330 coupled to base plate 320 at a first end of housing 330. The housing 330 contains electronics (not shown) for interpreting the air data collected from air data probe 310. For example, housing 330 can contain at least one processor and an associated memory component.

Figure 5A:
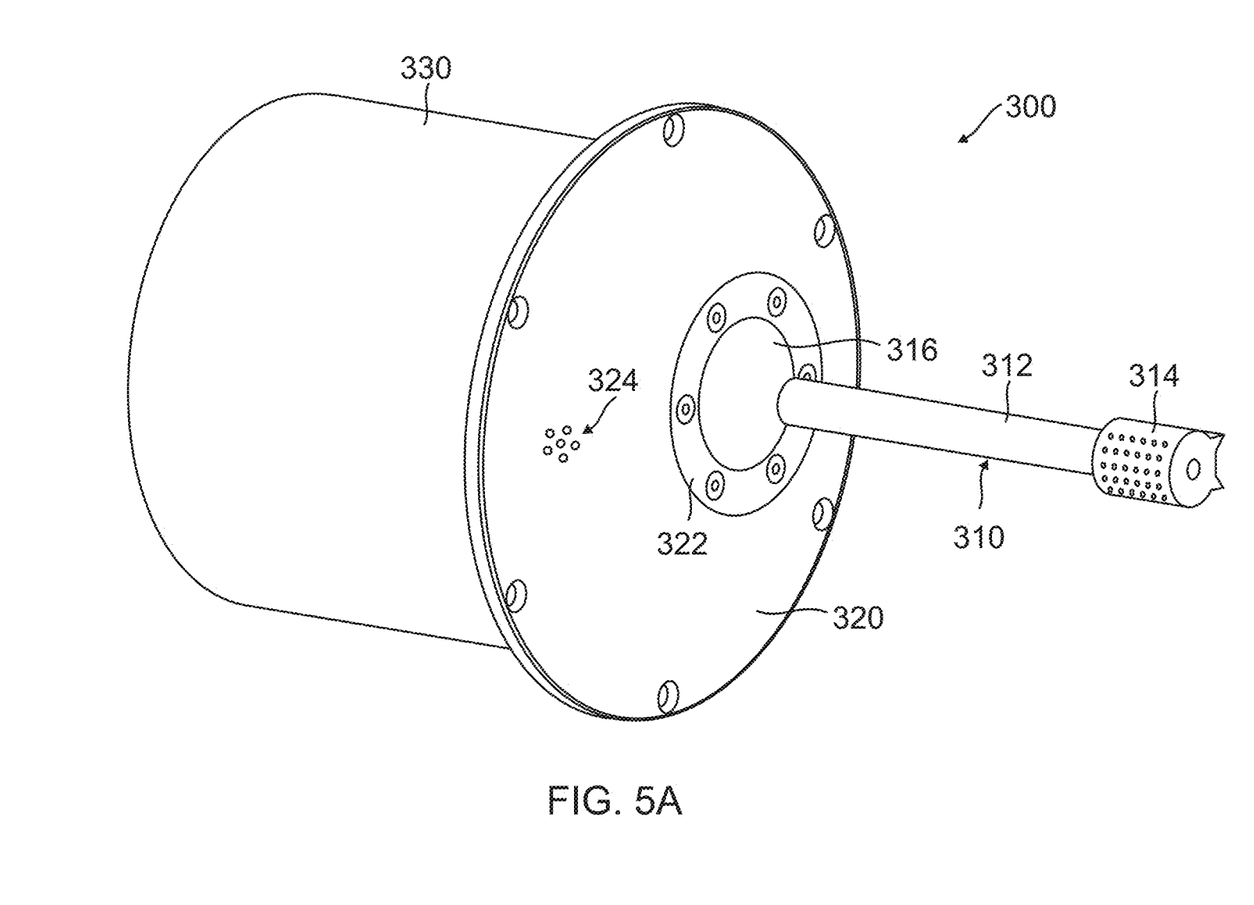
FIG. 5A is an isometric exterior view a multi-function air data sensor, according to an exemplary embodiment.
Figure 5B:
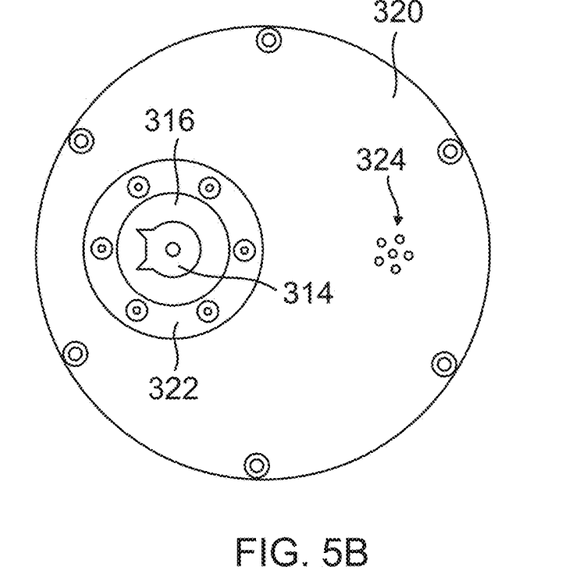
FIG. 5B is a front view of the air data sensor of FIG. 5A.
Figure 5C:
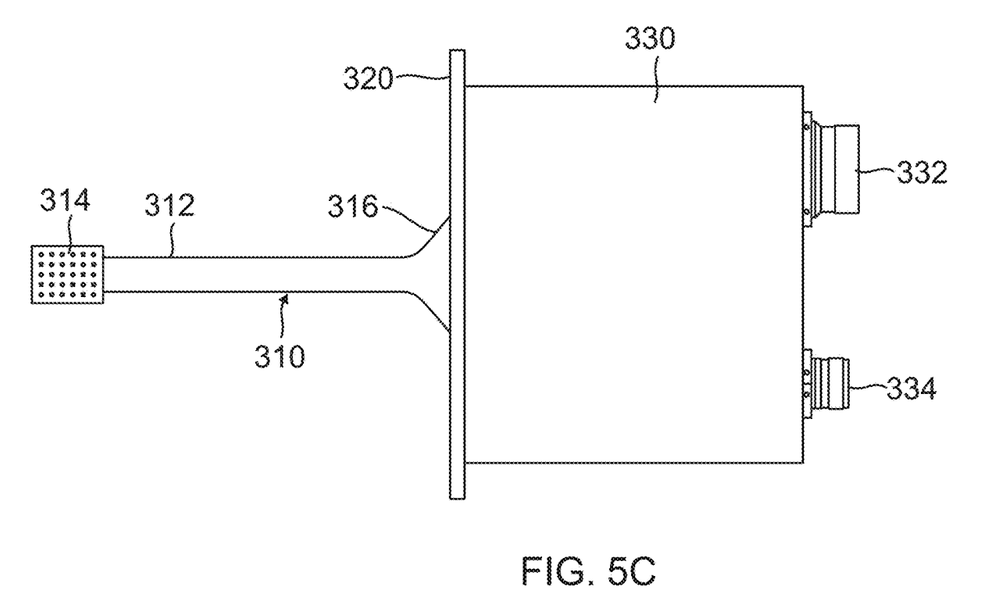
FIG. 5C is a side view of the air data sensor of FIG. 5A.
Figure 5D:
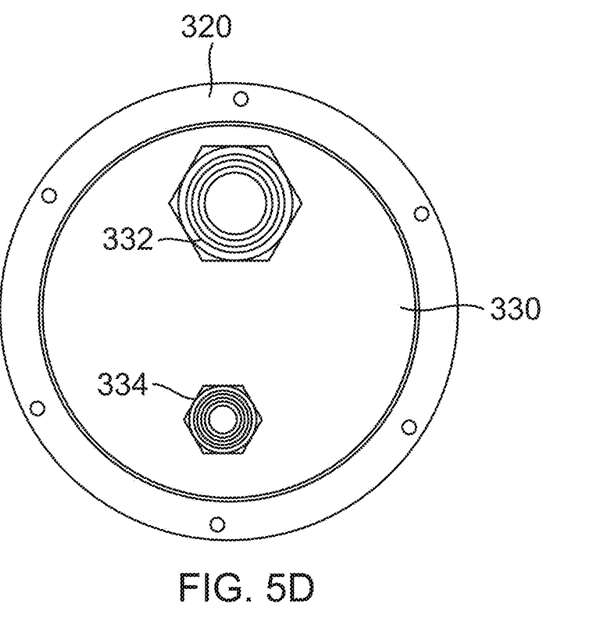
FIG. 5D is a rear view of the air data sensor of FIG. 5A.

As shown in FIGS. 5C and 5D, a pair of input/output couplers 332, 334 are located at an opposite second end of housing 330. The input/output couplers 332, 334 are configured to provide for electrical connections with the electronics in housing 330.

The air data probe 310 can have a similar structure as air data probe 100 described previously. As such, air data probe 310 generally includes a probe stem 312, a probe head 314 coupled to probe stem 312 at one end, and a base flange 316 coupled to probe stem 312 at an opposite end. The base flange 316 is coupled to base plate 320 such as through a bolted ring structure 322. The air data probe 310 is positioned at a first location that is offset from a center of base plate 320. A set of multiple static pressure ports 324 are positioned at a second location on base plate 320, with the second location also being offset from the center of base plate 320.

The air data probe 310 and static pressure ports 324 are operative to make measurements used by the processor to determine angle of attack, total pressure, and static pressure values. In some embodiments, air data sensor 300 can be implemented in a digital line replaceable unit (LRU) for a vehicle such as an aircraft. For example, air data sensor 300 can be mounted in an aircraft nose section as part of a digital LRU, in one implementation.

In some implementations, the multi-function air data probe can incorporate a digital component and software algorithm method that provides a self-aware health assessment and management capability for the air data probe.

Figure 6:
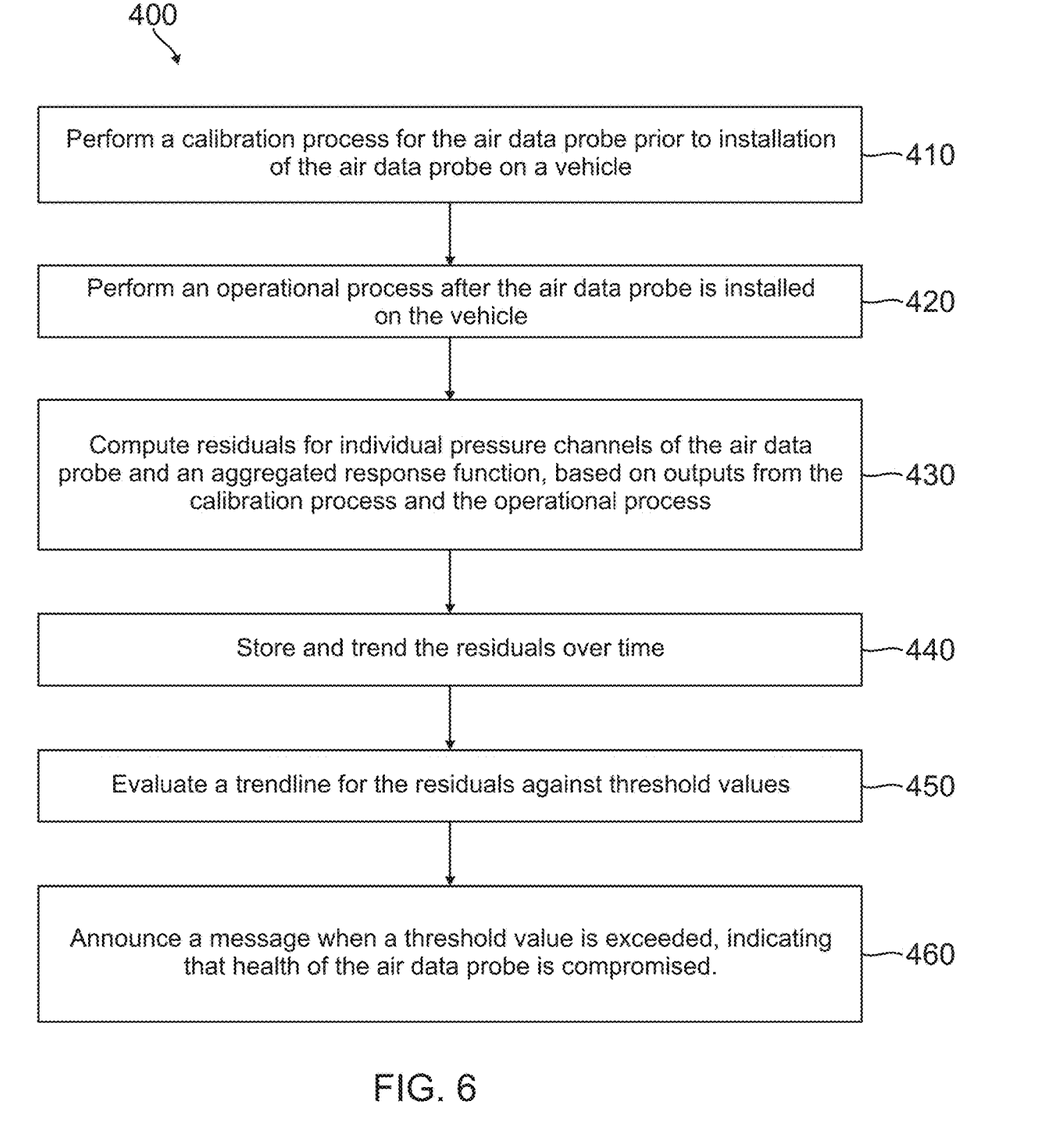
FIG. 6 is a flow diagram of a method for providing health management and assessment for a multi-function air data probe, according to one implementation.

FIG. 6 is a flow diagram of a method 400 for providing health management and assessment for a multi-function air data probe, according to one implementation. The method 400 initially includes performing a calibration process for the air data probe prior to installation of the air data probe on a vehicle (block 410). The method 400 also performs an operational process after the air data probe is installed on the vehicle (block 420). The method 400 computes residuals for individual pressure channels of the air data probe and an aggregated response function, based on outputs from the calibration process and the operational process (block 430). The method 400 then stores and trends the residuals over time (block 440), and evaluates a trendline for the residuals against threshold values (block 450). The method 400 announces a message when a threshold value is exceeded, indicating that the health of the air data probe is compromised (block 460).

Figure 7:
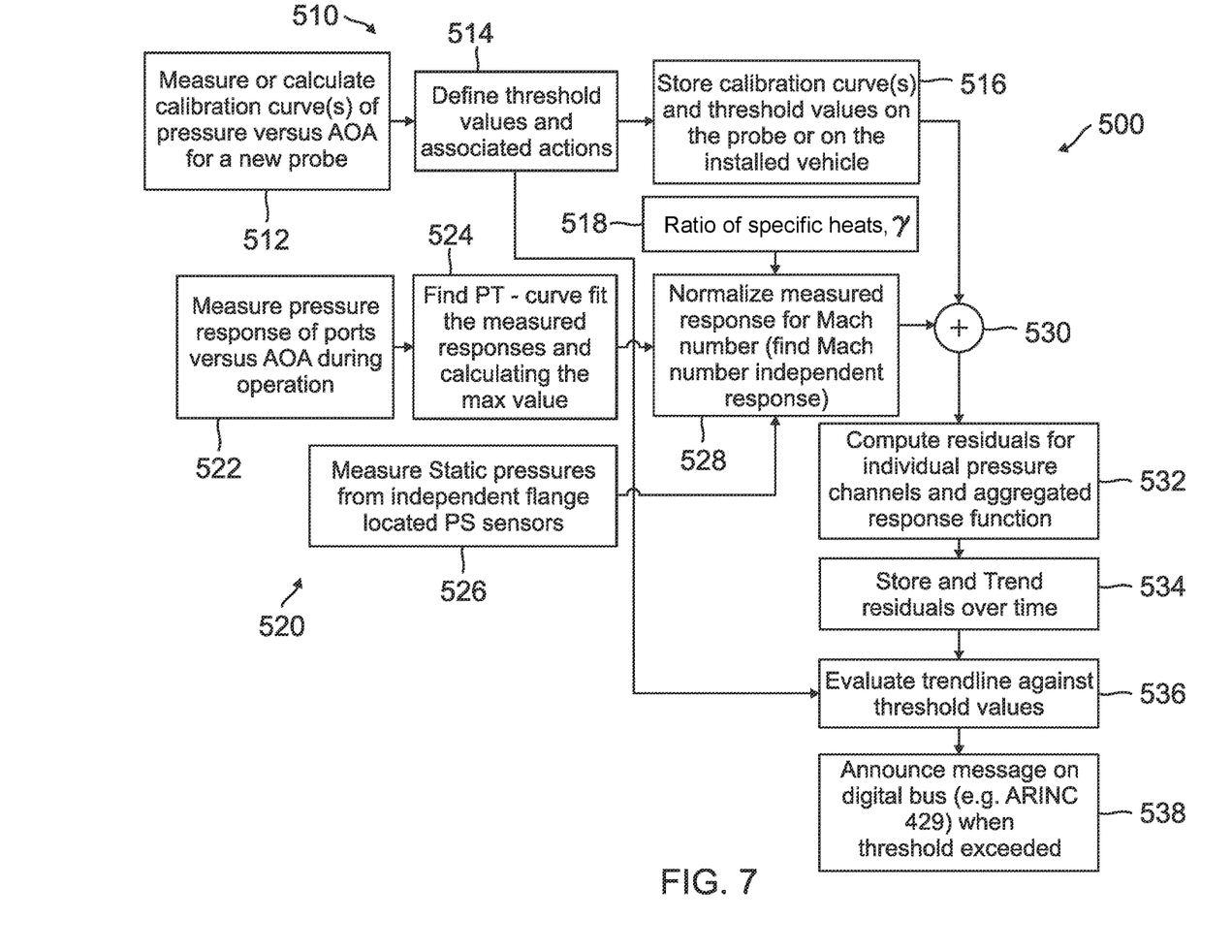
FIG. 7 is a flow diagram of a method for providing health management and assessment for a multi-function air data probe, according to an example implementation.

FIG. 7 is a flow diagram showing further details of a method 500 for providing health management and assessment for a multi-function air data probe, according to one example implementation. The method 500 initially includes a calibration process 510 that is carried out prior to installation of the air data probe on a vehicle such as an aircraft. The calibration process 510 measures or calculates a calibration curve(s) of pressure versus AOA for a new probe (block 512). The calibration process 510 then defines threshold values and associated actions (block 514), and stores the calibration curve(s) and threshold values on the probe itself or on a vehicle where the probe is installed (block 516). A ratio of specific heats, y, are also stored in the same manner (block 518).

The method 500 also includes an operational process 520 that is carried out after the probe is installed and functioning on the vehicle (e.g., aircraft). The operational process 520 measures the pressure response of the ports (e.g., five ports) on the probe versus AOA during operation of the vehicle (block 522). The operational process 520 then finds a total pressure (PT), by curve fitting the measured pressure responses and calculating a maximum value (block 524). The operational process 520 also measures static pressures from independent flange located static pressure (PS) sensors during operation of the vehicle (e.g., during flight) (block 526). The operational process 520 then normalizes the measured responses for Mach number (finds Mach number independent response) (block 528), by using the ratio of specific heats (from block 518).

The method 500 then combines an output from the calibration process 510 with an output of the operational process 520 in an adder 530. The output from adder 530 is used to compute residuals for individual pressure channels and an aggregated response function (block 532), and the residuals are stored and trended over time (block 534). The method 500 then evaluates a trendline against the threshold values (block 536), which were defined in the calibration process 510 (at block 514). The method 500 then announces a message on a digital bus (e.g. ARINC 429), when a threshold is exceeded (block 538), indicating that the health of the air data probe is compromised.

Further details of the calibration process and operational process for the air data probe follow.

In one example, the calibration process can be implemented by calibrating the air data probe in an open jet wind tunnel. The calibration process can create static pressure (PS) port calibration (CP) curves for the following exemplary Mach values:

Mach=0.12, 0.26, 0.4, 0.6, 0.8, 0.95 (estimated range)

The calibration process than calculates a calibration parameter (CA) for each Mach data set as a function of AOA. The calibrations process calculates curves of Port PS/PT free stream vs Mach freestream, and calculates curves of Port PS/PS free stream vs Mach freestream.

In a probe measurement mode (operational process), the CA value is calculated using ports nearest the highest PS measurement. The AOA is calculated from averaged CA calibration (across flight envelope Mach range). This mode curve fits Port PS and calculates a maximum value, and uses this as a first guess for PT. For a low Mach, the Mach is calculated from Port PS/PT free calibration curves, and AOA is re-calculated using the Mach to interpolate CA from calibration curves. For a high Mach, the PS is obtained from probe base flange statics and/or the aircraft statics, and the Mach is calculated. The PT free is re-calculated using AOA to interpolate from Port PS/PT calibration curves, and the Mach is re-calculated from PS/PT free calibration curves. The final Mach is then calculated from PT and PS.

The following equations can be used in the calibration process and the measurement mode:

$$C_p = \frac{Ps - PS_{amb}}{PT_{amb} - PS_{amb}} \quad (1)$$

$$q_c = PT_{amb} - PS_{amb} \quad (2)$$

$$C_p = \frac{Ps - PS_{amb}}{q_c} \quad (3)$$

$$P_s = C_p q_c + PS_{amb} \quad (4)$$

$$PT_{amb} = \frac{Ps - PS_{amb}}{C_p} + PS_{amb} \quad (5)$$

where $C_p$ is the difference between the as measured and ambient static pressure as a fraction of impact pressure; $q_c$ is the free stream impact pressure; $P_s$ is the measured static pressure; PTamb is the free stream ambient total pressure; and PSamb is the free stream ambient static pressure.

Figure 8:
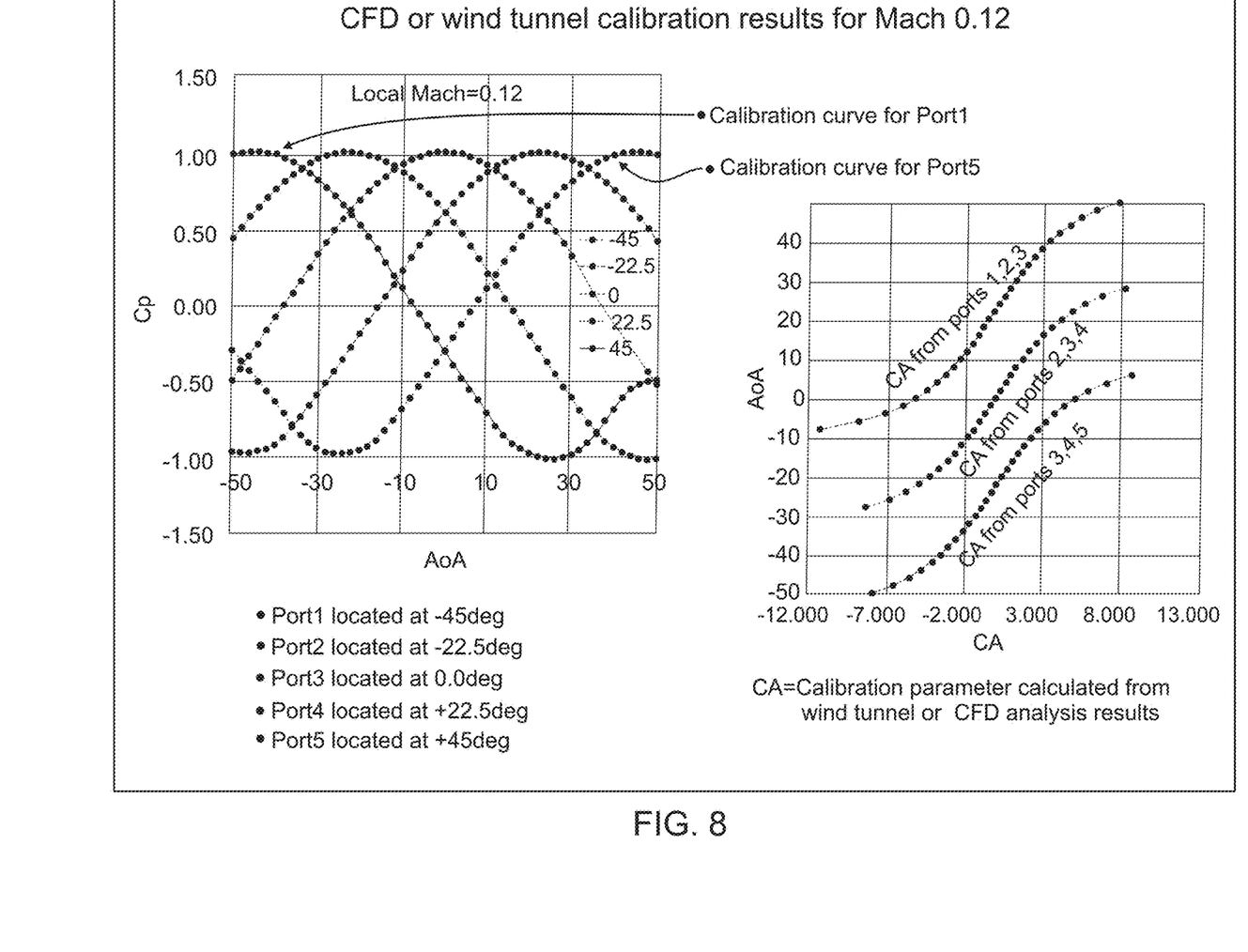
FIGS. 8 and 9 are graphical representations of sample calibration curves obtained for a multi-function air data probe.
Figure 9:
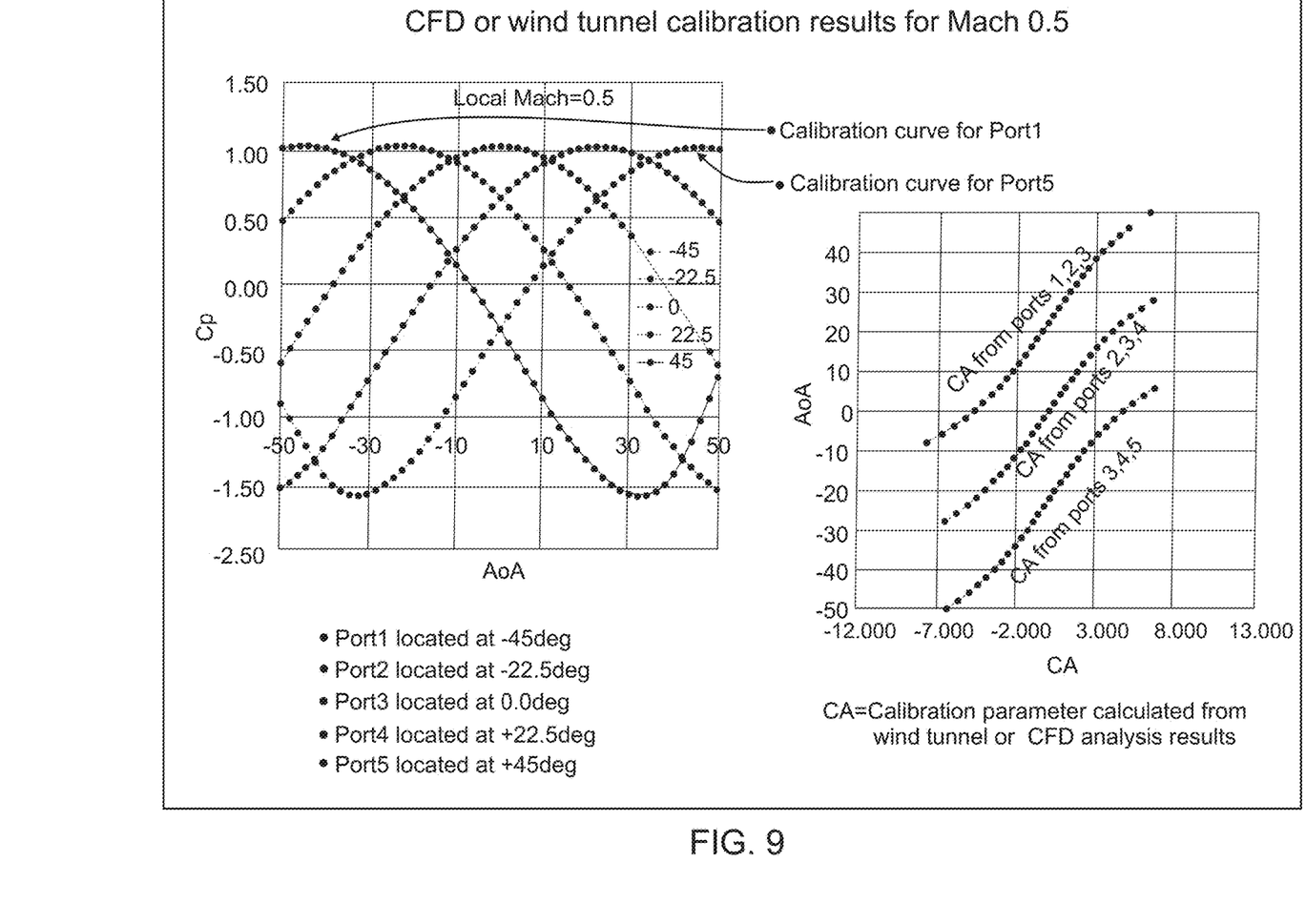

FIGS. 8 and 9 are graphical representations of sample calibration curves obtained over a range of AOA that is up to ±50° for a multi-function air data probe. In this example, the air data probe port locations are as follows: port 1 is located at −45 deg AOA; port 2 is located at −22.5 deg AOA; port 3 is located at 0.0 deg AOA; port 4 is located at +22.5 deg AOA,; and port 5 is located at +45 deg AOA. In this example, the five separate pressure measurements by the air data probe make it possible to create three separate calibration curves to fully span a ±50° range.

Curves can be generated for Mach =0.1, 0.2, . . . 1.1 to meet the PT and AOA accuracy requirements for aircraft. FIG. 8 shows typical computational fluid dynamics (CFD) or wind tunnel calibration results for Mach 0.12, and FIG. 9 shows typical CFD or wind tunnel calibration results for Mach 0.5. The calibration parameter, CA, is calculated directly from the results. During operation, the individual pressure measurements can be cross-checked using the calibration curves to diagnose potential plugging and or pressure module failure.

A computer or processor used in the present systems and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present methods.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes a multi-function air data probe, comprising: a probe stem having an outer surface that extends between a first end and an opposite second end, the probe stem having a first cross-sectional diameter; a probe head having an outer surface that extends between a proximal end and a distal end, wherein the proximal end of the probe head is coupled to the first end of the probe stem, wherein the probe head has a second cross-sectional diameter that is larger than the first cross-sectional diameter of the probe stem; and a plurality of multi-hole ports located in the probe head, the multi-hole ports extending into and through the probe stem; wherein the air data probe is operative to make measurements used to determine one or more of angle of attack values, total pressure values, and static pressure values.

Example 2 includes the multi-function air data probe of Example 1, further comprising a base flange coupled to the probe stem at the opposite second end; and one or more static pressure ports in the base flange.

Example 3 includes the multi-function air data probe of any of Examples 1-2, further comprising a drain hole located at the distal end of the probe head.

Example 4 includes the multi-function air data probe of any of Examples 1-3, wherein the probe stem and the probe head each have has a substantially cylindrical shape.

Example 5 includes the multi-function air data probe of any of Examples 1-4, wherein the second cross-sectional diameter of the probe head is least about 10 percent larger than the first cross-sectional diameter of the probe stem.

Example 6 includes the multi-function air data probe of any of Examples 1-5, further comprising a first set of flow stability structures extending along the outer surface of the probe stem; and a second set of flow stability structures extending along the outer surface of the probe head.

Example 7 includes the multi-function air data probe of Example 6, wherein the first and second sets of flow stability structures encourage smooth air flow off a trailing edge of the structures to avoid vortex shedding.

Example 8 includes the multi-function air data probe of any of Examples 6-7, wherein the first and second sets of flow stability structures are matching fins on left and right hand sides of a principle structure of the air data probe, with the fins having a substantially triangular cross section profile.

Example 9 includes the multi-function air data probe of any of Examples 1-8, wherein the outer surface of the probe head includes an array of sensor holes that communicate with the multi-hole ports in the probe head, the array of sensor holes arranged in a set of sensor hole rows.

Example 10 includes the multi-function air data probe of Example 9, wherein the multi-hole ports each include respective sensor manifold tubes that respectively communicate with one of the sensor hole rows through respective sets of multiple port tubes.

Example 11 includes the multi-function air data probe of Example 10, further comprising a drain port communicatively coupled to the sensor manifold tubes, the drain port configured to provide an outlet for excess air from the manifold tubes.

Example 12 includes the multi-function air data probe of any of Examples 1-11, wherein the air data probe is configured to be mounted on an aircraft.

Example 13 includes an air data sensor, comprising: a multi-function air data probe configured to protrude into an airflow to collect air data, the air data probe comprising a probe stem that extends between a first end and an opposite second end, the probe stem having a first cross-sectional diameter; a probe head coupled to the first end of the probe stem, wherein the probe head has a second cross-sectional diameter that is larger than the first cross-sectional diameter of the probe stem; a plurality of multi-hole ports in the probe head, the multi-hole ports extending into and through the probe stem; and a base flange coupled to the probe stem at the opposite second end. A base plate is coupled to the base flange of the air data probe; and an electronics housing is coupled to the base plate, with the electronics housing containing at least one processor. The base plate includes one or more static pressure ports that extend into the electronics housing. The air data probe and the one or more static pressure ports are operative to make measurements used by the at least one processor to determine one or more of angle of attack values, total pressure values, and static pressure values.

Example 14 includes the air data sensor of Example 13, wherein the air data probe is positioned at a first location on the base plate that is offset from a center of the base plate; and the one or more static pressure ports are positioned at a second location on the base plate that is offset from the center of the base plate.

Example 15 includes the air data sensor of any of Examples 13-14, wherein the air data sensor is implemented in a digital line replaceable unit (LRU) for an aircraft.

Example 16 includes a method of health management and assessment for an air data probe, the method comprising: performing a calibration process for the air data probe prior to installation of the air data probe on a vehicle; performing an operational process after the air data probe is installed on the vehicle; computing residuals for individual pressure channels of the air data probe and an aggregated response function, based on outputs from the calibration process and the operational process; storing and trending the residuals over time; evaluating a trendline for the residuals against one or more threshold values; and announcing a message when one or more of the threshold values is exceeded, indicating that the health of the air data probe is compromised.

Example 17 includes the method of Example 16, wherein the calibration process comprises: measuring or calculating one or more calibration curves of pressure versus angle of attack (AOA) for the air data probe; defining the one or more threshold values and associated actions; storing the one or more calibration curves and the one or more threshold values; and storing a ratio of specific heats.

Example 18 includes the method of Example 17, wherein the operational process comprises: measuring a pressure response of ports in the air data probe with respect to AOA during operation of the vehicle; determining a total pressure by curve fitting the measured pressure response of the ports and calculating a maximum value; measuring static pressure responses from independently located static pressure sensors during operation of the vehicle; and normalizing the measured responses for Mach number.

Example 19 includes the method of any of Examples 16-18, wherein the air data probe comprises: a probe stem that extends between a first end and an opposite second end, the probe stem having a first cross-sectional diameter; a probe head coupled to the first end of the probe stem, wherein the probe head has a second cross-sectional diameter that is larger than the first cross-sectional diameter of the probe stem; a plurality of multi-hole ports in the probe head, the multi-hole ports extending into and through the probe stem; a base flange coupled to the probe stem at the opposite second end; and one or more static pressure ports in the base flange; wherein the probe stem and the probe head each have a substantially cylindrical shape.

Example 20 includes the method of any of Examples 16-19, wherein the vehicle is an aircraft, and the air data probe is configured to provide measurement of aircraft AOA, static pressure, and total pressure.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method of health management and assessment for an air data probe, the method comprising:
    performing a calibration process for the air data probe prior to installation of the air data probe on a vehicle, wherein the air data probe comprises:
        a probe stem having an outer surface that extends along an axial direction between a first end and an opposite second end, the probe stem having a first cross-sectional diameter;
        a probe head having an outer surface that extends along the axial direction between a proximal end and a distal end, wherein the proximal end of the probe head is coupled to the first end of the probe stem, wherein the probe head has a second cross-sectional diameter that is larger than the first cross-sectional diameter of the probe stem; and a plurality of multi-hole ports located in the probe head, the multi-hole ports extending into and through the probe stem along the axial direction, the multi-hole ports defined by respective sensor manifold tubes each having a plurality of openings;

wherein the outer surface of the probe head includes an array of sensor holes radially arranged in sensor hole rows along the axial direction, and wherein each of the sensor manifold tubes respectively communicates with one of the sensor hole rows along the axial direction through respective port tubes coupled between each of the sensor holes and the plurality of openings in the respective sensor manifold tubes;

performing an operational process after the air data probe is installed on the vehicle;

computing residuals for individual pressure channels of the air data probe and an aggregated response function, based on outputs from the calibration process and the operational process;

storing and trending the residuals over time;

evaluating a trendline for the residuals against one or more threshold values; and announcing a message when one or more of the threshold values is exceeded, indicating that the health of the air data probe is compromised.

2. The method of claim 1, wherein the calibration process comprises:

measuring or calculating one or more calibration curves of pressure versus angle of attack for the air data probe;

defining the one or more threshold values and associated actions; and storing the one or more calibration curves and the one or more threshold values.

3. The method of claim 2, wherein the operational process comprises:

measuring a pressure response of the multi-hole ports in the air data probe with respect to angle of attack during operation of the vehicle;

determining a total pressure by curve fitting the measured pressure response of the multi-hole ports and calculating a maximum value;

measuring static pressure responses from independently located static pressure sensors during operation of the vehicle; and normalizing the measured responses for Mach number.

4. The method of claim 1, wherein the air data probe further comprises:

a base flange coupled to the probe stem at the opposite second end; and one or more static pressure ports in the base flange;

wherein the probe stem and the probe head each have a substantially cylindrical shape.

5. The method of claim 1, wherein the vehicle is an aircraft.

6. The method of claim 5, wherein the air data probe is configured to provide measurement of angle of attack, static pressure, and total pressure, for the aircraft.

7. An air data sensor system, comprising:

a multi-function air data probe on a vehicle, the air data probe configured to protrude into an airflow to collect air data, wherein the air data probe comprises:

a probe stem having an outer surface that extends along an axial direction between a first end and an opposite second end, the probe stem having a first cross-sectional diameter;

a probe head having an outer surface that extends along the axial direction between a proximal end and a distal end, wherein the proximal end of the probe head is coupled to the first end of the probe stem, wherein the probe head has a second cross-sectional diameter that is larger than the first cross-sectional diameter of the probe stem; and a plurality of multi-hole ports located in the probe head, the multi-hole ports extending into and through the probe stem along the axial direction, the multi-hole ports defined by respective sensor manifold tubes each having a plurality of openings;

wherein the outer surface of the probe head includes an array of sensor holes radially arranged in sensor hole rows along the axial direction, and wherein each of the sensor manifold tubes respectively communicates with one of the sensor hole rows along the axial direction through respective port tubes coupled between each of the sensor holes and the plurality of openings in the respective sensor manifold tubes; and an electronics housing coupled to the air data probe, the electronics housing containing at least one processor;

wherein the at least one processor is operative to perform a method of health management and assessment for the air data probe, the method comprising:

computing residuals for individual pressure channels of the air data probe and an aggregated response function, based on outputs from a prior calibration process and operational process;

storing and trending the residuals over time;

evaluating a trendline for the residuals against one or more threshold values; and announcing a message when one or more of the threshold values is exceeded, indicating that the health of the air data probe is compromised.

8. The air data sensor system of claim 7, wherein the air data probe is operative to make measurements used by the at least one processor to determine one or more of angle of attack values, total pressure values, and static pressure values.

9. The air data sensor system of claim 7, wherein the vehicle is an aircraft.

10. The air data sensor system of claim 9, wherein the air data probe is implemented in a digital line replaceable unit (LRU) for the aircraft.

* * * * *